United States Patent
Harada et al.

[19]

[11] Patent Number: 6,106,880
[45] Date of Patent: Aug. 22, 2000

[54] METHOD FOR MAKING A CYLINDRICAL FOOD CONSISTING OF A PLURALITY OF CONCENTRIC CYLINDRICAL LAYERS

[75] Inventors: Masaru Harada, Kanagawa-ken; Koji Masuda, Saitama-ken; Masayuki Imai, Chiba-ken, all of Japan

[73] Assignee: Kabushiki Kaisha Kibun Shokuhin, Tokyo, Japan

[21] Appl. No.: 09/181,989

[22] Filed: Oct. 29, 1998

Related U.S. Application Data

[62] Division of application No. 08/780,325, Jan. 8, 1997, Pat. No. 5,866,174.

[30] Foreign Application Priority Data

| Jan. 10, 1996 | [JP] | Japan | 8-19418 |
| Jan. 10, 1996 | [JP] | Japan | 8-19419 |

[51] Int. Cl.$^7$ .................................................. A23P 1/00
[52] U.S. Cl. ........................ 426/514; 426/143; 426/501
[58] Field of Search ................................. 426/496, 512, 426/514, 501, 502, 143; 425/130, 134, 261, 321, 322

[56] References Cited

U.S. PATENT DOCUMENTS

| 2,746,403 | 5/1956 | Hansen | 426/501 |
| 3,606,639 | 9/1971 | Brockhank | 425/261 |
| 4,101,255 | 7/1978 | Fernaeus et al. | 425/261 |
| 4,110,482 | 8/1978 | Sato | 425/322 |
| 4,298,326 | 11/1981 | Orlowski | 425/261 |
| 4,882,175 | 11/1989 | Ream et al. | 426/514 |
| 5,697,290 | 12/1997 | Watanabe et al. | 425/321 |

FOREIGN PATENT DOCUMENTS

| 2 671 943 | 7/1992 | France . |
| 36 25 578 | 2/1988 | Germany . |
| 44-8046 | 4/1969 | Japan . |
| 63-116088 | 7/1988 | Japan . |
| 5-60905 | 9/1993 | Japan . |
| 7-23747 | 1/1995 | Japan . |
| 9-75040 | 3/1997 | Japan . |

OTHER PUBLICATIONS

WPI Abstract Accession No. 86–200522/31 & JP61132160A.

*Primary Examiner*—George Yeung
*Attorney, Agent, or Firm*—Wenderoth, Lind & Ponack, L.L.P.

[57] ABSTRACT

A method and apparatus for making a hollow cylindrical food which is formed of a plurality of concentrically wound rectangular sheets with leading and tailing edges abutting against each other. The apparatus includes a device which shapes food paste into rectangular sheets. In addition, a conveying device is provided to transfer the rectangular sheets to a transverse bar. The transverse bar is rotatable and movable vertically from the conveying device. The bar is used to wind the sheets, successively, so that the winding of one sheets is started are the preceding sheet has been completely wound.

5 Claims, 18 Drawing Sheets

METHOD FOR MAKING A CYLINDRICAL FOOD CONSISTING OF A PLURALITY OF CONCENTRIC CYLINDRICAL LAYERS

This application is a divisional of Ser. No. 08/780,325, filed Jan. 8, 1997, now U.S. Pat. No. 5,866,174.

BACKGROUND OF THE INVENTION

This invention relates to a cylindrical food consisting of a plurality of concentric cylindrical layers of food material and a method and apparatus for making the same.

In Japan, a hollow cylindrical food made from fish paste material called "Chikuwa" is well known, and is made by first shaping a fish paste material into a cylinder around a bar, then broiling the cylindrical material and thereafter removing the broiled material from the bar. Japanese Laid-Open Patent Application No. Hei 7-23747 discloses a new type of "Chikuwa" containing a cylindrical cheese embedded in a cylindrical fish paste material. The new type of "Chikuwa" is, as shown in FIGS. 1(a)–1(d), produced by putting a rectangular cheese paste sheet C on a rectangular fish paste sheet F (FIG. 1(b)), then, winding those sheets around a cylindrical bar B (FIG. 1(c)), then broiling the cylindrical material consisting of the sheets and, thereafter, removing it from the bar (FIG. 1(d)). However, the cheese sheet C in the hollow cylindrical food produced through such steps rarely has the form of a true cylinder. In other words, it is difficult to make opposite end edges of the wound cheese sheet abut against each other.

Further, according to the above-noted Japanese Patent Application, winding of fish paste and cheese paste sheets are effected manually which is inefficient.

SUMMARY OF THE INVENTION

Accordingly, it is an object of this invention to provide a hollow cylindrical food consisting of a plurality of food paste sheets which are concentric with each other and have opposite end edges which abut against each other.

According to one aspect of this invention, there is provided a new method of producing a cylindrical food consisting of a plurality of concentric cylindrical layers of food material. The method includes the steps of conveying at least one set of a plurality of rectangular food paste sheets which are spaced from each other in the conveying direction at predetermined distances along a predetermined path in such a manner that the leading edge and the tailing edge of each rectangular food paste sheet are substantially normal to the conveying direction or extend widthwise relative to the path. In addition, a bar is provided in such a manner that it extends transversely to the path and is rotatable about its axis and movable vertically relative to the path. The rectangular food paste sheets of the set are conveyed to the bar where the sheets are engaged with and wound around the bar. The lengths of the successive rectangular food sheets of the above-noted set are increased from the leading or first sheet. Thus each of the sheets around the bar has its leading and tailing edges engaged with and abutting each other. The rectangular sheets of the above-noted set are spaced from each other on the conveyer so that winding of one of the sheets commences after the preceding sheet has been completely wound.

In a preferred embodiment, at least one of the rectangular sheets of the above-noted set has an inclined tailing end surface extending rearwardly from the tailing edge of an inner surface of the rectangular sheet, which will become a radially inside surface, to the tailing edge of an outer surface of the rectangular sheet, which will become a radially outside surface. The radially outermost and innermost rectangular food sheets are wider than the remaining sheets so that when they are wound, the outermost and innermost sheets will be engaged with each other along their outer opposite edges. Consequently, the remaining materials can not be seen from the outside. It is preferred that vertical end face shaping surfaces are provided at opposite sides of the path downstream of the position where the bar is set as stated above. The bar on which all the rectangular paste sheets of the above-noted set have been wound to form a cylindrical food is conveyed downstream with the bar rotated about its axis. The food is then passed between the end face shaping surfaces, where the opposite end faces of the cylindrical food on the bar are made substantially normal to the bar. Further, it is preferred that when the bar with the above-stated cylindrical food is conveyed downward between the vertical end face shaping surfaces, the bar is rotated so that the cylindrical food rotates on the surface of the conveying path with the bar being kept at a predetermined level above the surface of the conveying path. Thus, the distance between the axis of the bar and the surface is generally the same as the radius of the cylindrical food on the bar. Consequently, a slight pressure is applied to the food on the bar from the surface so that the shape of the food is rectified into a true cylinder and all the wound paste sheets constituting the cylindrical food firmly attach to each other.

According to another aspect of this invention, there is provided an apparatus for producing a cylindrical food which has a plurality of concentric cylindrical layers of food material. The apparatus includes means for shaping paste food materials into a plurality of rectangular sheets. The apparatus also includes means for conveying at least one set of a plurality of the rectangular sheets. The sheets are spaced from each other in the conveying direction at predetermined distances along a predetermined path in such a manner that the leading edge and the tailing edge of each of the rectangular sheets are normal to the conveying direction. Furthermore, the apparatus has means for supporting a bar in such a manner that the bar extends transversely to the path. The bar is adjacent to the path and is rotatable about its axis and movable vertically relative to the path. The rectangular sheets of the set conveyed to the position where the bar is provided and are engaged with and wound around the bar in sequence. The apparatus is characterized in that the means for shaping forms the rectangular sheets such that the longitudinal lengths of the rectangular sheets of the above-noted set are increased successively from the leading or first sheet in the conveying direction. Thus, the leading and tailing edges of each of the would sheets are engaged with each other. In addition, the conveying means conveys the rectangular sheets of the above-noted set in such a manner that the sheets are spaced from each other so that winding of one of the rectangular sheets is started after the preceding rectangular sheet has been completely wound.

The shaping means includes at least one mold adapted to receive a food material therein to shape the material into a rectangular sheet. The mold includes a rectangular recess defined by a rectangular surrounding wall, a rectangular bottom wall and a rectangular opening opposite to the bottom wall. The bottom wall is generally flat but is also inclined at the tailing end portion thereof in the conveying direction. Thus, the incline approaches the opening as it moves away from the bottom wall. It is preferred that the apparatus further includes vertical end face shaping surfaces at opposite sides of the path downstream of the position where the bar is set as stated above. The bar is conveyed downstream, with the bar being rotated about its axis after all the food sheets of the above-stated set have been wound to form the cylindrical food, passing between the end face shaping surfaces, whereby the opposite end faces of the cylindrical food on the bar are shaped to be substantially normal to the bar. Further, it is preferred that the apparatus includes means for keeping the bars conveyed between the end face shaping surfaces at a predetermined level above the surface of the path. The level is such that the distance between the path surface and the axis of the bar is generally equal to the radius of the cylindrical food on the bar. Consequently, a slight pressure is applied to the food from the path surface so that the shape of the food is rectified into a true cylinder and all the wound paste sheets constituting the cylindrical food are firmly attached to each other.

According to the other aspect of this invention, there is provided a hollow cylindrical food which is produced by winding a plurality of rectangular food paste sheets around a bar concentrically with each other and then removing the bar. The food is characterized in that the leading and tailing edges of each rectangular sheet in the conveying direction are engaged with each other. In a preferred embodiment, at least one of the wound sheets, or a radially outermost wound sheet, has an inclined end surface extending rearward from the tailing edge of the radially inside surface to the tailing edge of the radially outside surface. Further, the radially outermost and innermost wound sheets are wider than the remaining sheets. Thus, the outermost and innermost sheets are engaged with each other along their outer opposite edges, and hence the remaining materials can not be seen from the outside.

These and other objects of this invention will become clear from the following detailed description of preferred embodiments when taken in conjunction with the accompanying drawings.

DETAILED DESCRIPTION OF THE INVENTION

Figure 1A:
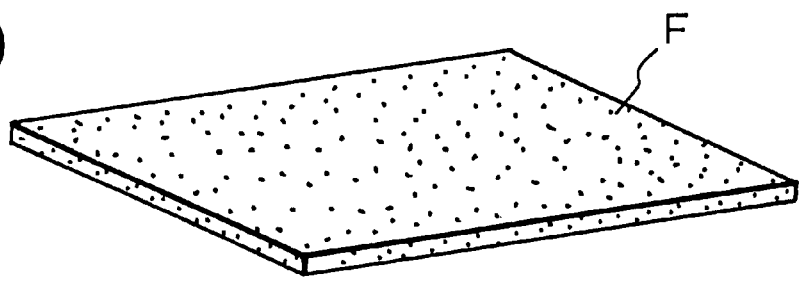
FIGS. 1(a)–1(d) are perspective views of a prior art production of a hollow cylindrical food.
Figure 1B:
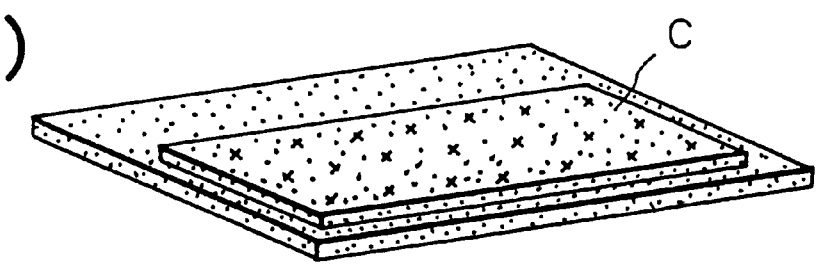
Figure 1C:
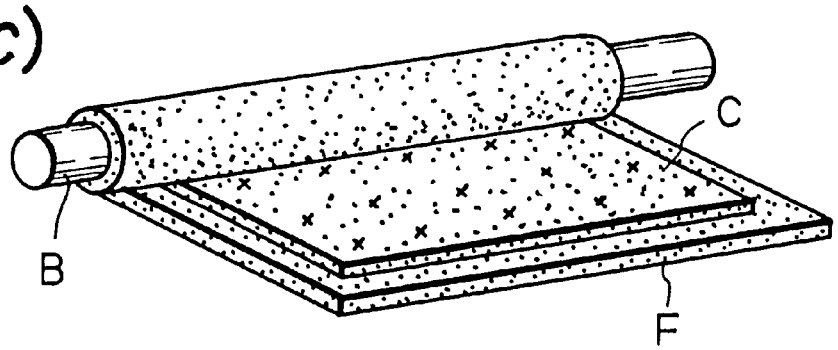
Figure 1D:
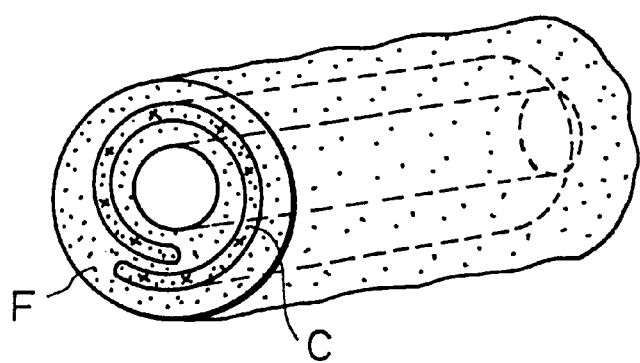
Figure 2:
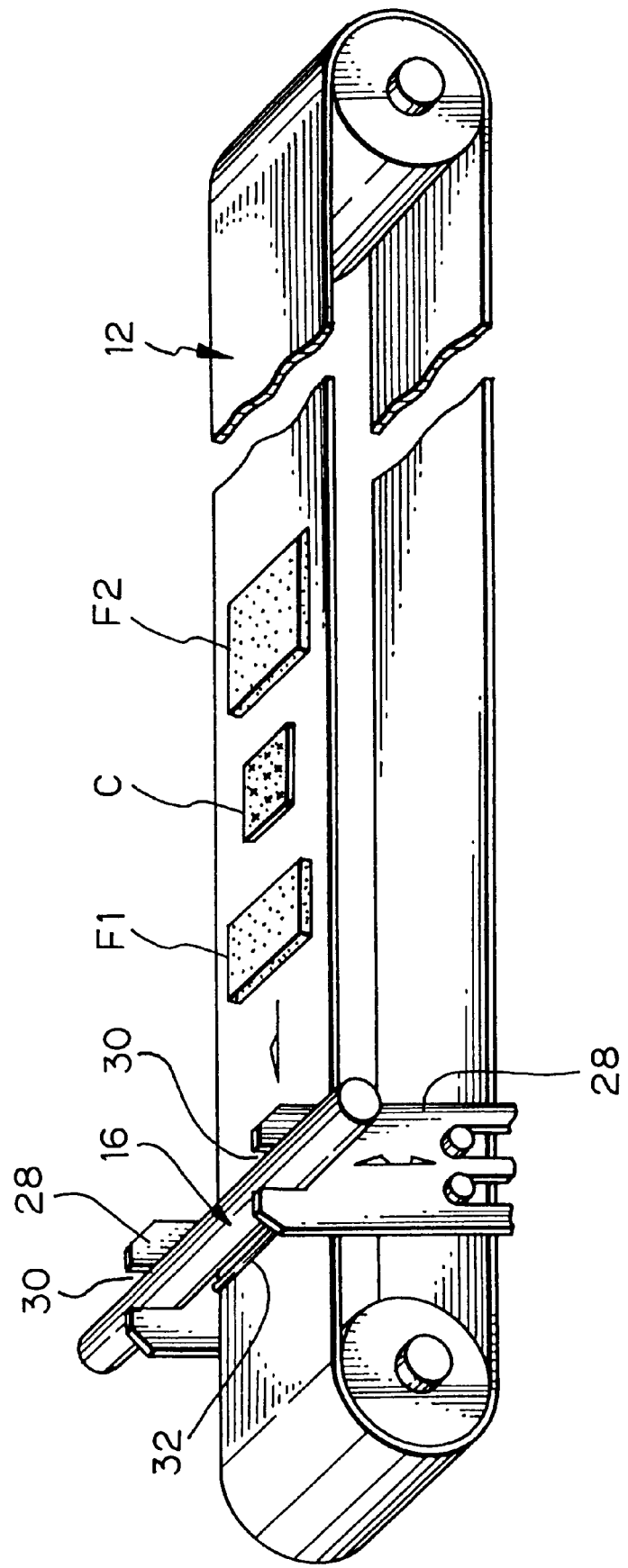
FIG. 2 is a perspective view of a main portion of an apparatus for producing a hollow cylindrical food in accordance with this invention.
Figure 3:
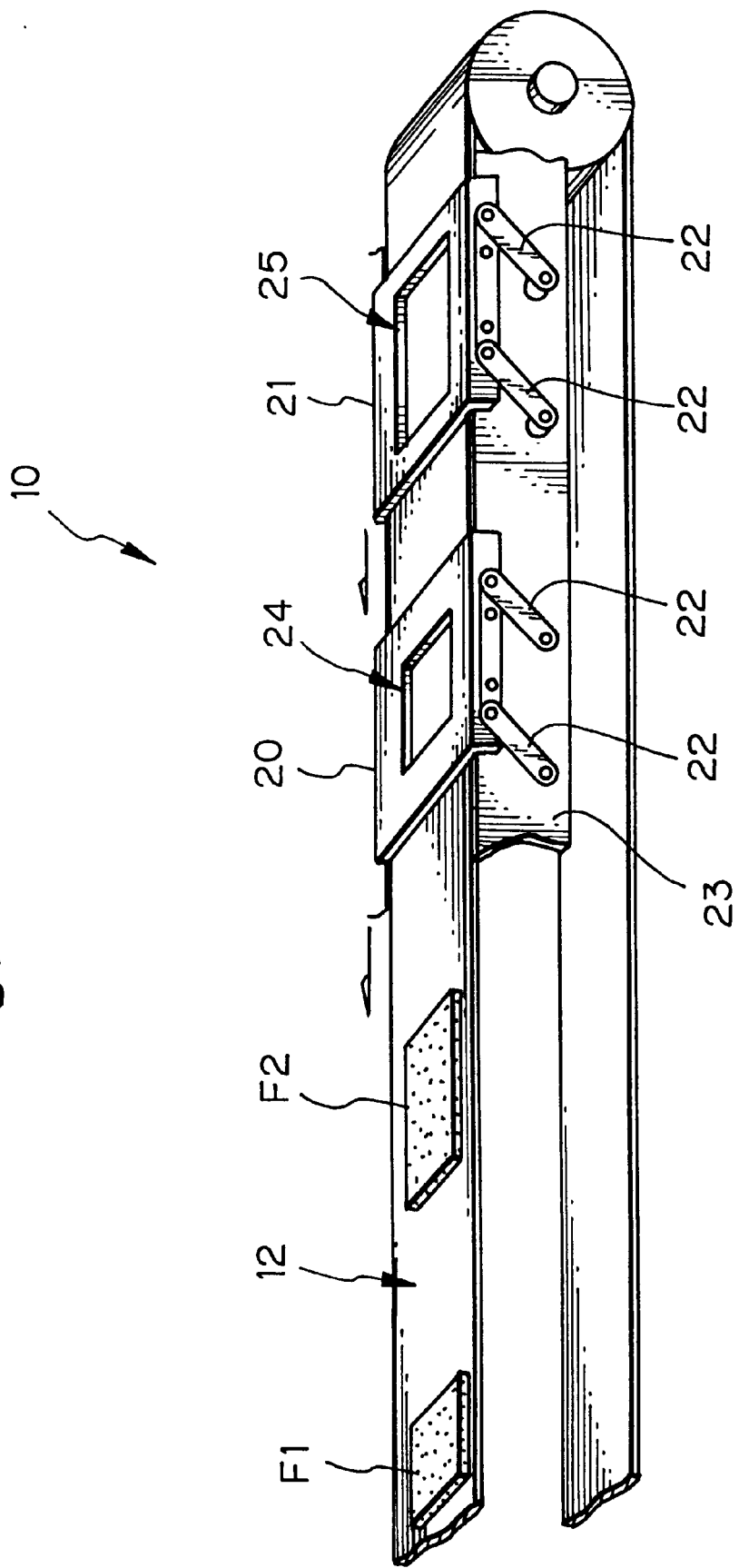
FIG. 3 is a perspective view of a paste shaping means used in connection with the apparatus of FIG. 2.
Figure 4A:
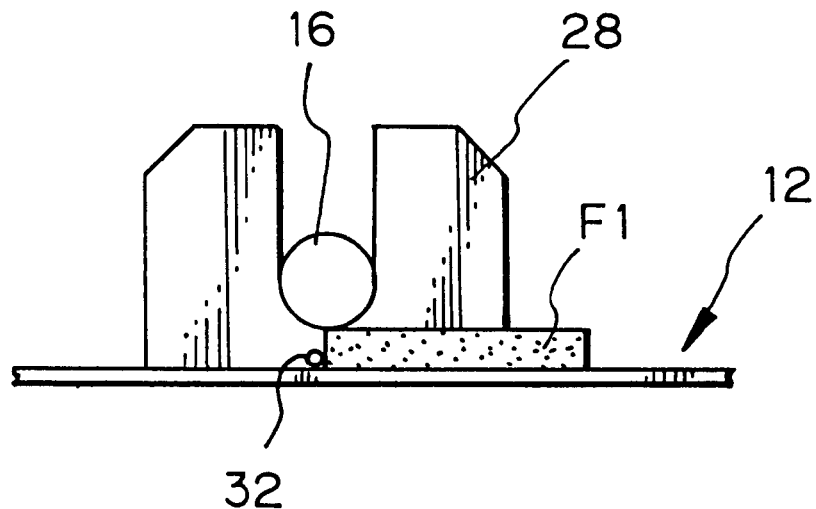
FIGS. 4(a)–6(c) are views of the production of a hollow cylindrical food produced by the apparatus of FIG. 2.
Figure 4B:
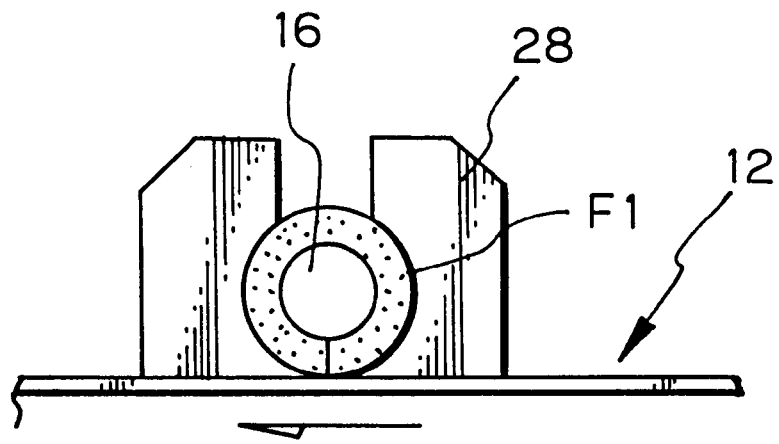
Figure 5A:
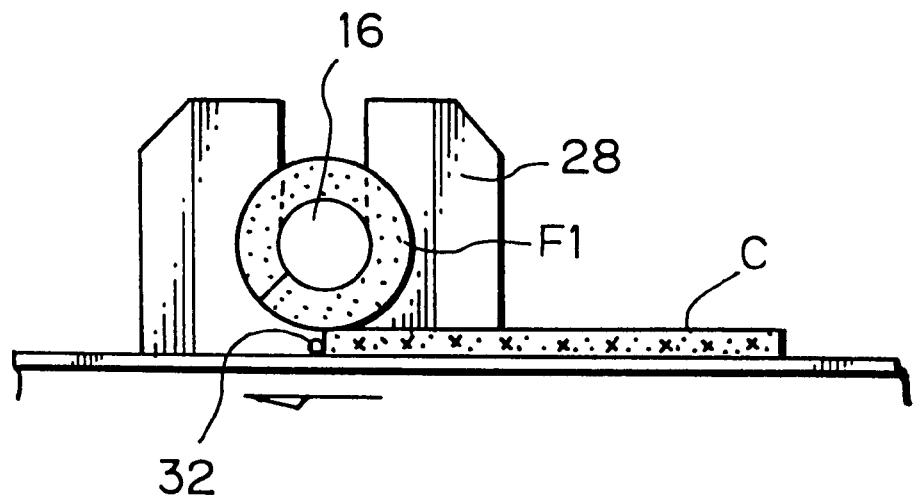
Figure 5B:
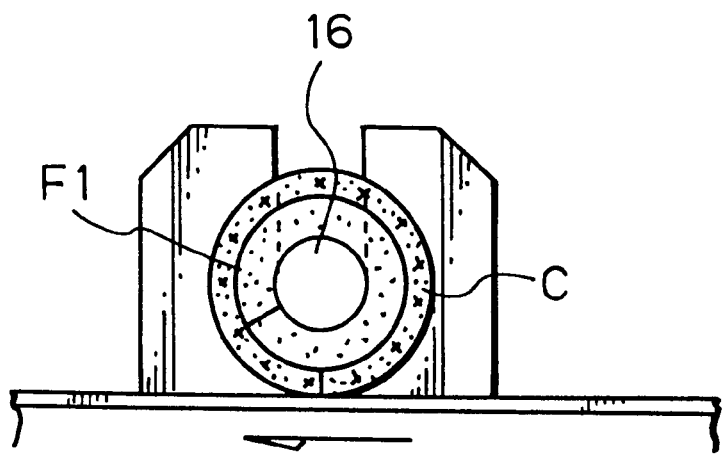

Referring now to FIGS. 2–4, there is shown an apparatus in accordance with a first embodiment of the present invention for producing a cylindrical food or "Chikuwa."

The apparatus is particularly suited for producing a new type of "Chikuwa" which consists of three concentric cylindrical layers, i.e., innermost and outermost layers of fish paste, and a cheese paste layer embedded between the outermost and innermost fish paste layers.

The apparatus includes paste shaping means 10 (FIG. 3) for shaping food paste into a plurality of sheets. Conveyor means or an endless conveyor 12 are also provided (FIG. 2) for conveying sets of a predetermined number of rectangular food paste sheets, or three paste sheets in this embodiment, in such a manner that the leading edge and the taiing edge of each of the rectangular sheets are substantially normal to the conveying direction or in other words extend widthwise relative to the conveyor. Next, bar supporting means are provided for supporting a bar 16 above the conveyor belt surface in such a manner that the bar extends transversely of the path of the conveyor. The bar is rotatable about its axis and movable vertically relative to the conveyor. Finally, the rectangular paste sheets of the set conveyed to the bar are engaged with and wound around the bar.

The shaping means shown in FIG. 3 includes first and second rectangular frames 20, 21 each of which is supported at opposite sides by a pair of parallel links 22. The links are of equal length and are pivotably connected to the sides of the first and second rectangular frames 20, 21 and to side members 23 of the conveyor. The links extend along opposite sides of the conveyor to form a parallel link mechanism, whereby the first and second rectangular frames can be moved up and down while remaining parallel with the conveyor belt surface. When the rectangular frames are at a lower position, where they substantially come in contact with the surface of the conveyor, an operator can, in this embodiment, fill fish paste into the rectangular openings 24, 25 while stopping the movement of the conveyor. Then, the operator can lift the frames resuming the movement of the conveyor thereby conveying rectangular fish paste sheets F1 and F2 which have been formed by the first and second rectangular frames 20 and 21 and left on the conveyor. As shown, the opening 24 of the first frame is smaller than the opening 25 of the second frame in the conveying direction. The first and second frames 20 and 21 are separated from each other so that a rectangular cheese paste sheet C may be placed on the conveyor between the first and second fish paste sheets F1 and F2. The cheese paste sheet C is supplied by other paste shaping means (not shown) which, for instance, includes a hopper with a flat nozzle containing cheese paste. The hopper delivers an elongated cheese sheet the width of which is smaller than that of the first and second fish paste sheets F1 and F2. Next, cutter means are provided for cutting the elongated cheese sheet into a plurality of the above stated cheese sheets C. Then a device is provided for conveying the cheese sheets and intermittently supplying them onto the conveyor in such a manner that each of them is positioned between the first and second fish paste sheets as stated above. The details regarding the lengths of the first and second fish paste sheets and the distances between the first and second fish paste sheets and the cheese paste sheet will be explained later.

The bar supporting means includes a pair of support plates 28 provided at opposite sides of the conveyor. The opposite sides include elongated vertical grooves 30 which are aligned with each other in the widthwise direction of the conveyor. As shown, the grooves are adapted to receive the opposite ends of the bar 16 in such a manner that the bar is supported by the bottom walls of the grooves. The bar is held above the conveyer belt surface at a level such that the height of a space between the bar and the conveyor belt surface is less than the thickness of the first fish paste sheet F1. Furthermore, the bar can be moved vertically. The bar 16 is designed to have a certain amount of weight which enables the bar to impose pressure on the first fish paste sheet F1 thereby facilitating winding of the sheet F1 around the bar.

In FIG. 2, a piano wire 32 substantially contacts the upper surface of the conveyor belt and extends normal to and under the bar so as to scrape the paste sheets from the belt surface thereby facilitating winding of the sheets around the bar.

Figure 6A:
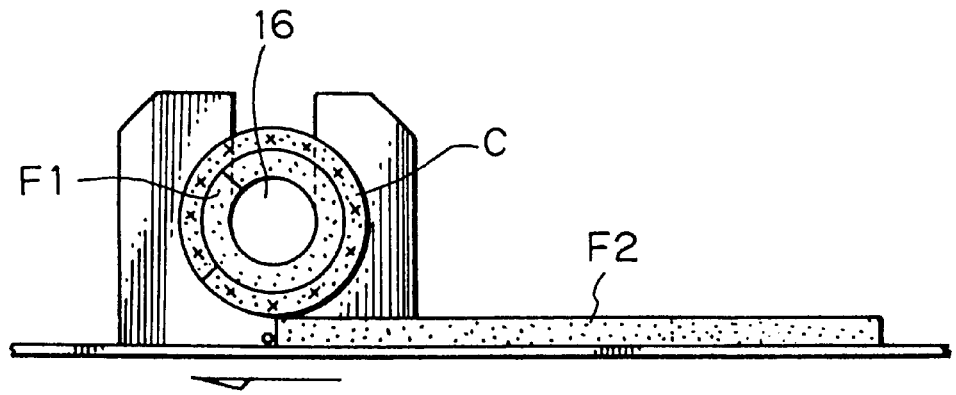
Figure 6B:
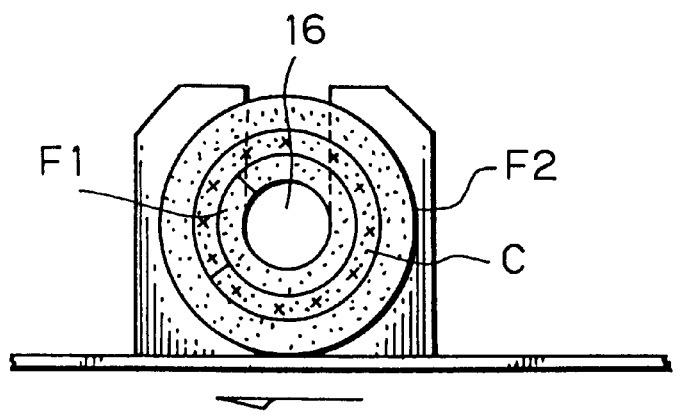
Figure 6C:
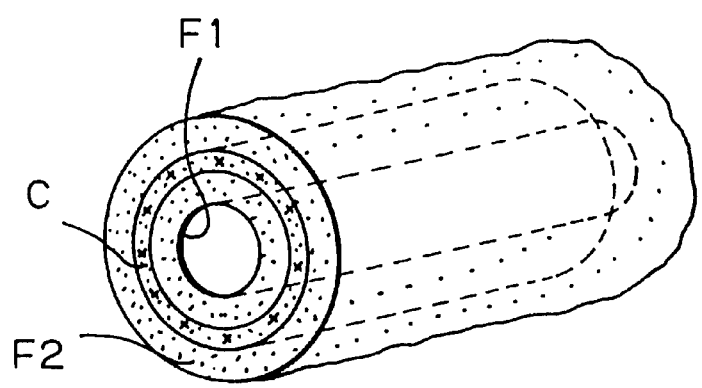

FIGS. 4(a)–6(c) show how the paste sheets are wound up around the bar. When the first fish paste sheet F1 has been conveyed to the bar support means, the upper surface of the sheet F1 is engaged by the bar 16 and the lower surface of the sheet is simultaneously engaged with the piano wire 32. Thus, the piano wire scrapes the sheet from the upper surface of the conveyor 12 and the bar simultaneously stats winding the sheet about the bar with the bar being rotated about its axis by the sheet. After the first fish paste sheet F1 has been wound around the bar, the following cheese sheet C arrives at the bar and then engages the first fish paste F1 whereby the sheet is wound around the first fish paste. As shown in FIGS. 6(a)–6(c), the second fish paste sheet is also wound in the same manner.

FIG. 6(c) shows a hollow cylindrical food of "Chikuwa" formed by removing the bar from the cylindrical sheets wound as stated above. As shown, the first and second fish paste sheets and the cheese sheet are concentrical and their opposite end edges abut against each other.

According to this invention, the lengths of the first fish paste sheet F1, the cheese paste sheet C and the second fish paste sheet F2 are increased successively so that the leading edge and the tailing edge of each of the sheets abut against each other when they are wound as stated above. Further, those sheets are put on the conveyor in the above order at predetermined distances so that winding operations of the cheese paste sheet C and the second fish paste sheet F2 begin after the preceding sheet has been completely wound.

Figure 7:
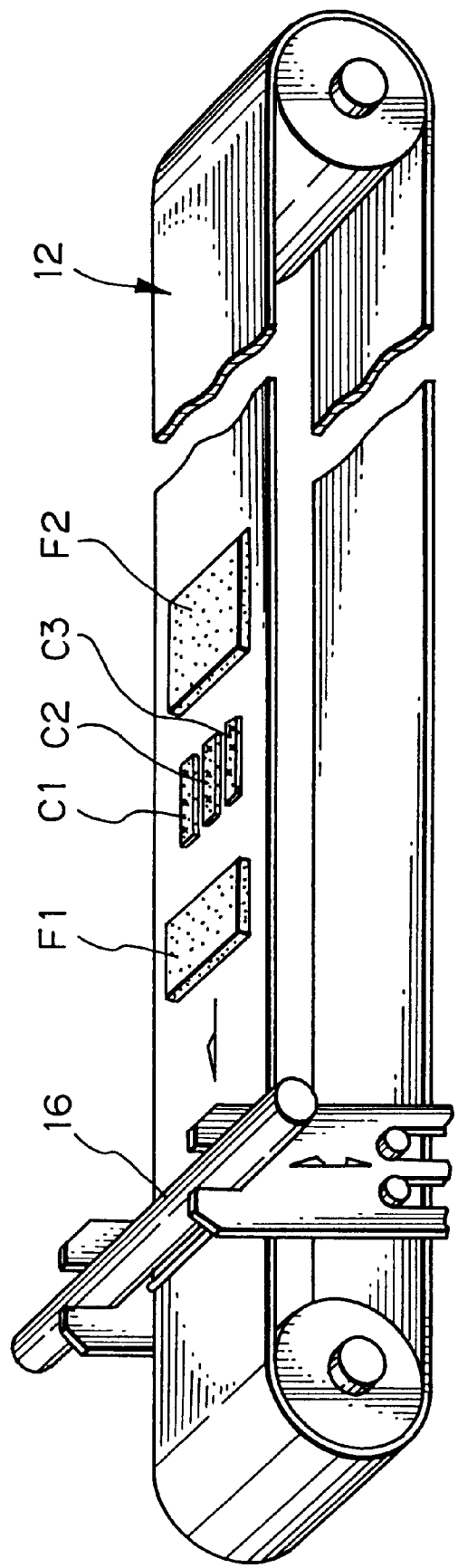
FIG. 7 is a perspective view of an apparatus for producing a hollowing cylindrical food in accordance with another embodiment of this invention.
Figure 8:
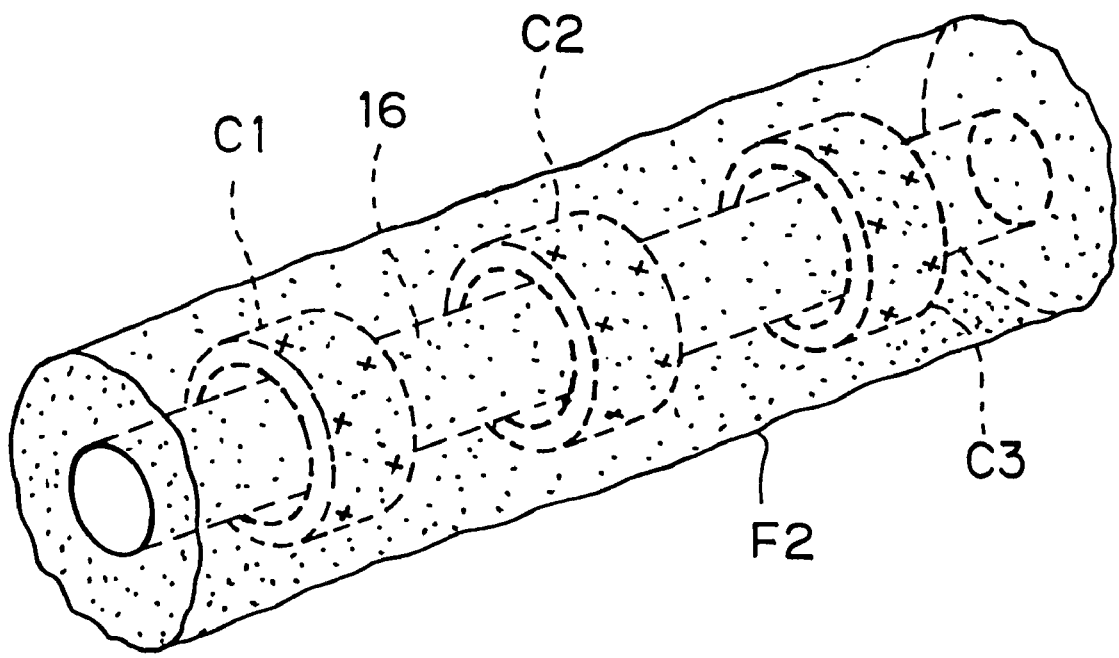
FIG. 8 is a perspective view of a hollow cylindrical food produced by the apparatus of FIG. 7.

FIGS. 7 and 8 show another embodiment where the cheese sheets are divided into three pieces C1, C2 and C3 which are spaced an equal distance from each other in the widthwise direction of the conveyor.

Figure 9:
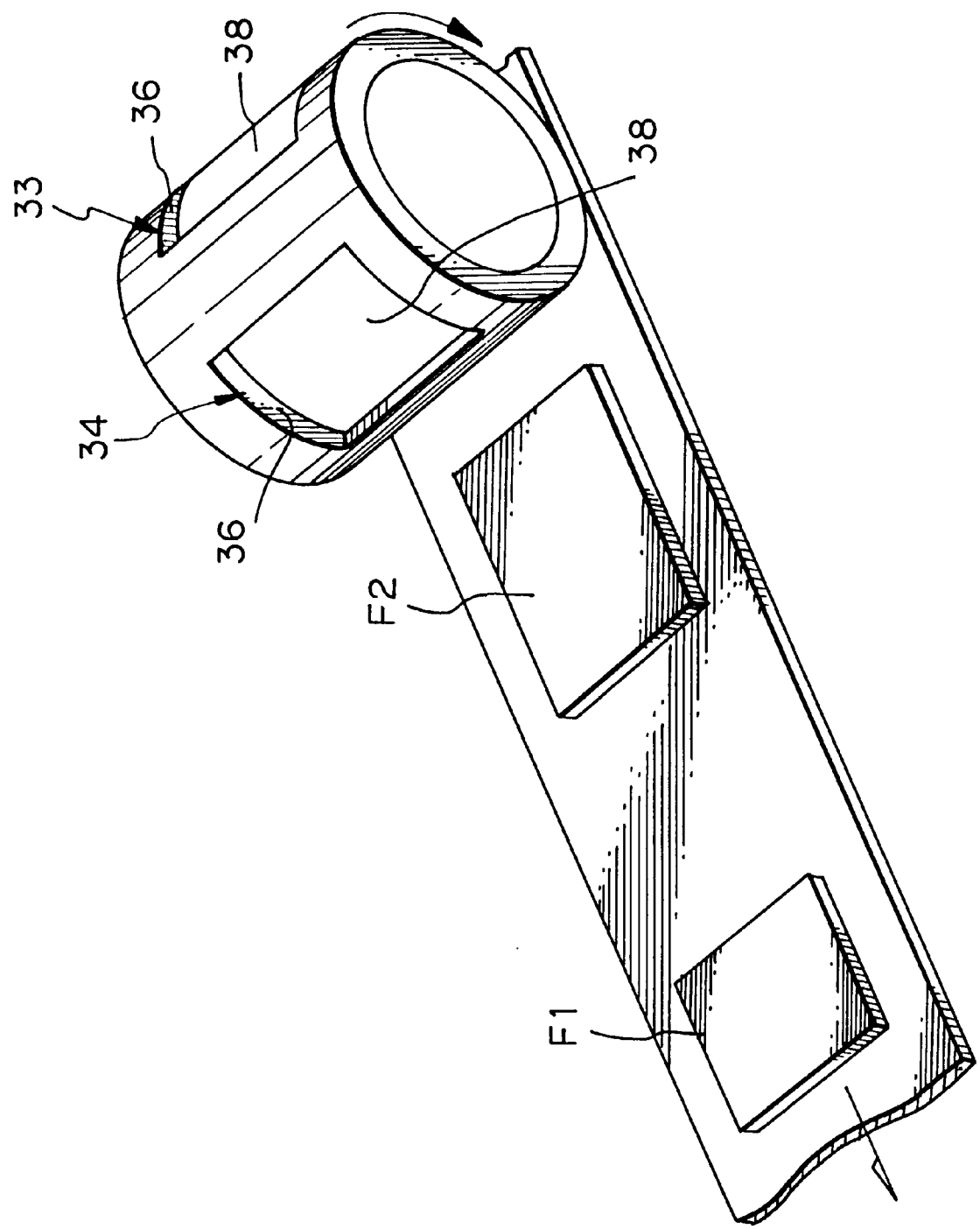
FIG. 9 is a perspective view of a paste shaping means in accordance with a second embodiment of this invention.

FIG. 9 shows a second embodiment in which first and second fish paste sheets F1 and F2 are formed by a drum having first and second molding recesses 33, 34. Each of the molding recesses is defined by a rectangular surrounding wall 36, a rectangular bottom wall 38 and a rectangular opening opposite to the bottom wall. The bottom wall is adapted to be moved radially outwardly from the position shown in FIG. 9. The molding recesses are adapted to receive fish paste from a fish paste supply means (not shown) to shape the material into the first and second fish paste sheets F1 and F2, respectively. Such formed rectangular sheets can then be pushed out from the recesses by moving the bottom wall radially outwardly.

Figure 10:
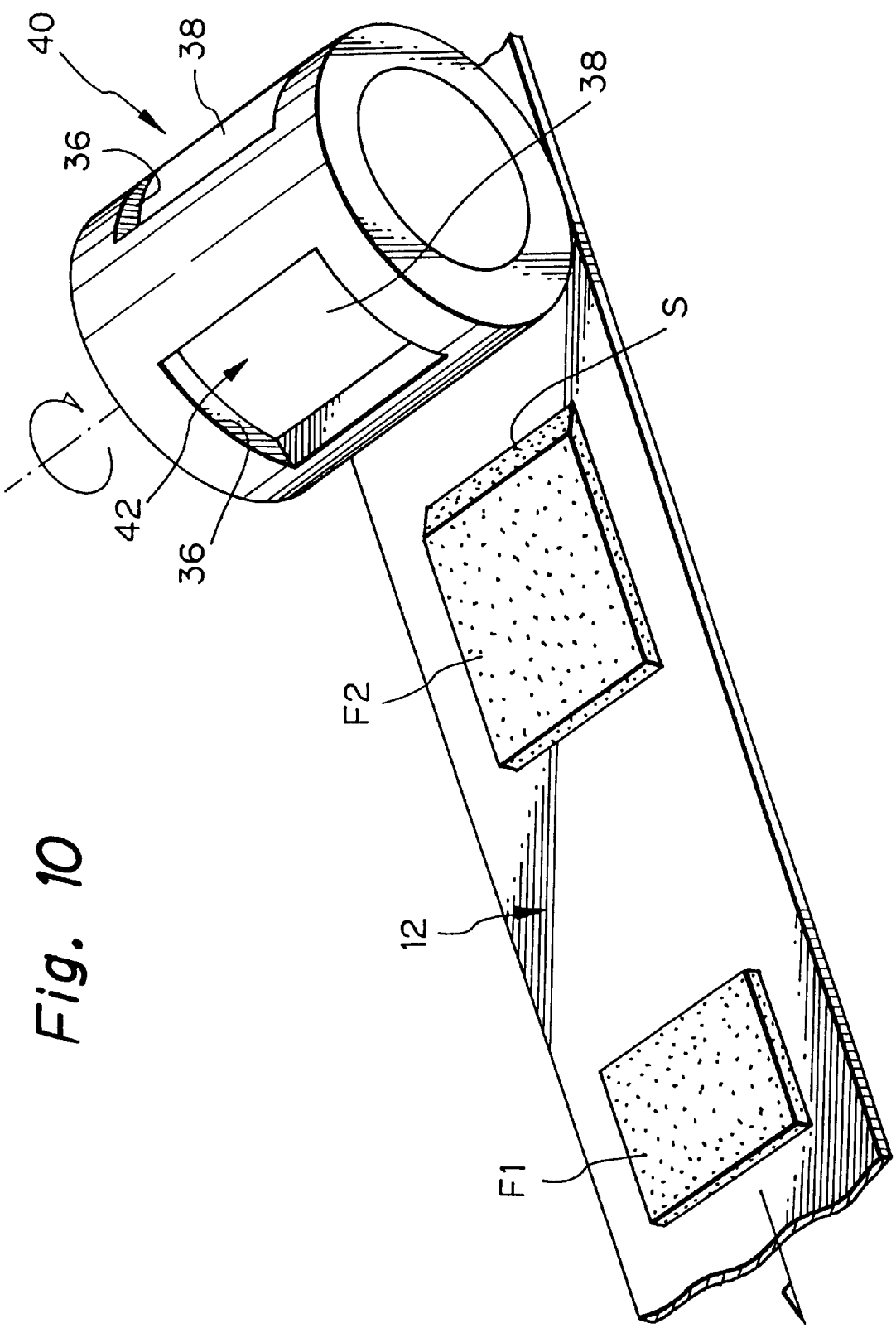
FIG. 10 is a perspective view of a paste shaping means in accordance with a third embodiment of this invention.
Figure 11:
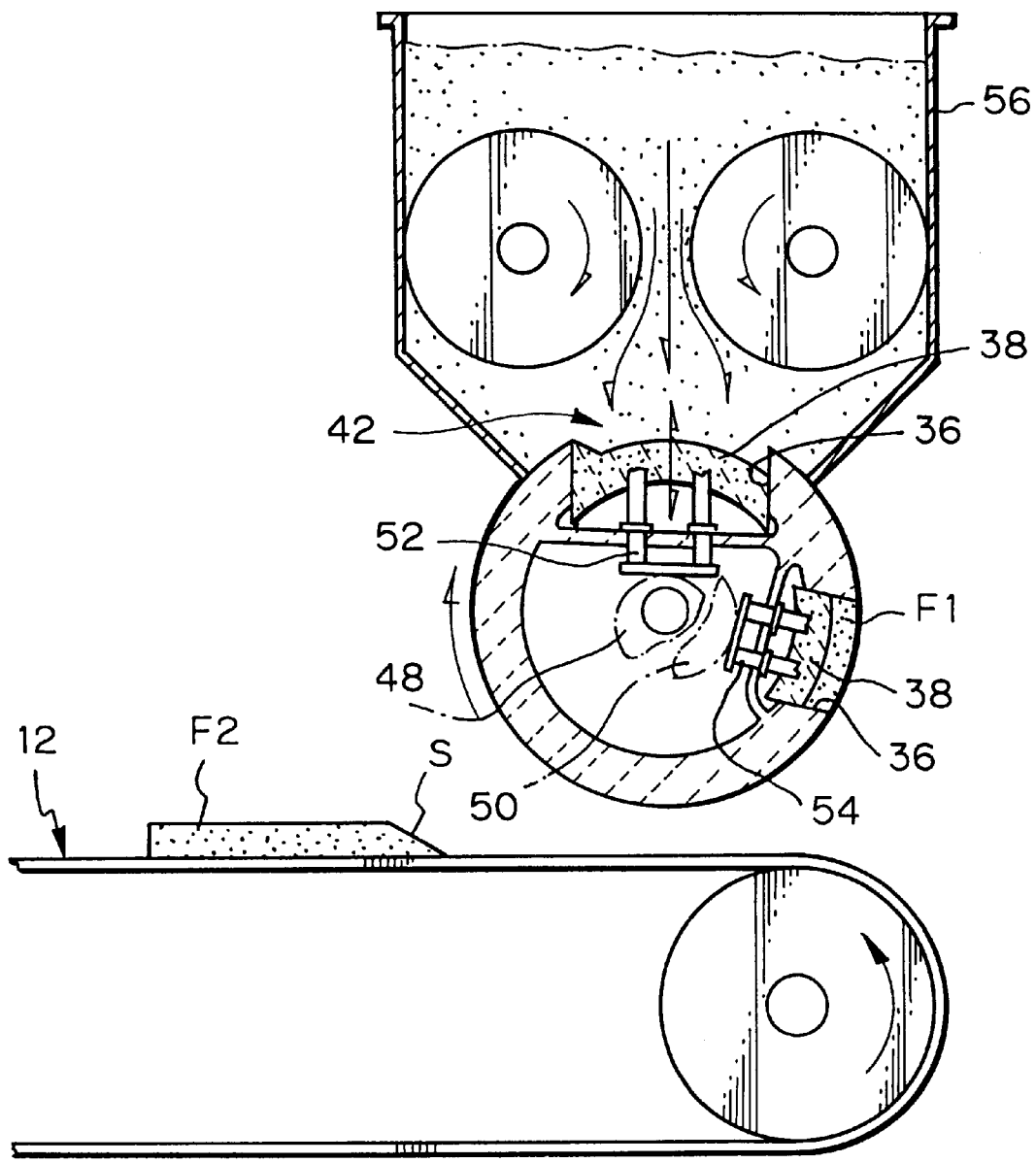
FIG. 11 is a cross-sectional view of the paste shaping means of FIG. 10.

FIGS. 10 and 11 show a third embodiment of the fish paste shaping means having a drum similar to that of the second embodiment. The construction of the molding recesses are generally the same as that of the second embodiment. The first recess 40 for forming the first fish paste sheet is the same as that of the above-stated second embodiment. However, the second molding recess 42 is different from that of the second embodiment. As shown, the second fish paste sheet F2 has an inclined tailing edge surface S which extends from the tailing edge of an upper surface of the sheet, a radially inside surface after the sheet is wound, to the tailing edge of a lower surface of the sheet, a radially outside surface after the sheet is wound. In order to form the inclined surface S, as best shown in FIG. 11, the surface of the bottom wall 38 is designed such that the tailing end portion inclines from the bottom wall to the opening of the recess 42. As noted from FIG. 11, the bottom walls are associated with a cam means which includes stationary cams 48 and 50 provided at the center of the drum and followers 52 and 54 connected to the bottom walls and engaged with the cams 48 and 50, respectively. Thus, when the recesses are positioned under paste supply means or hopper 56, the bottom walls are moved to the radially innermost position. In contrast, when the recesses come to face the upper conveyor surface, the bottom walls are radially moved outwardly to push rectangular paste sheets F1 and F2 out of the recesses.

Figure 12A:
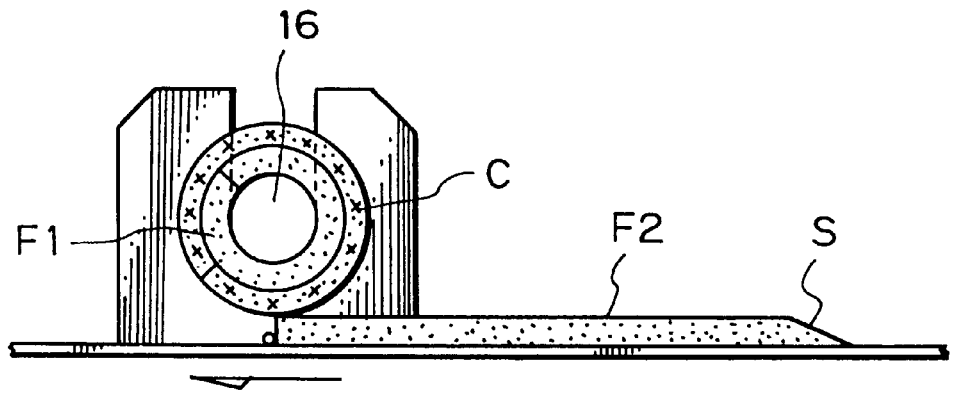
FIGS. 12(a)–12(c) are views of a second paste sheet formed by the paste shaping means of FIG. 11 being wound.
Figure 12B:
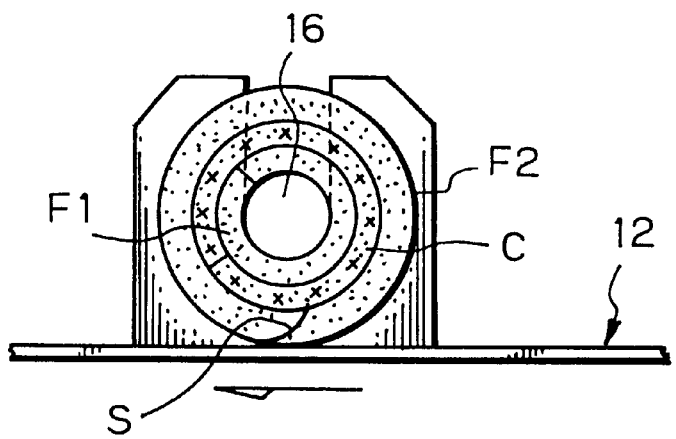
Figure 12C:
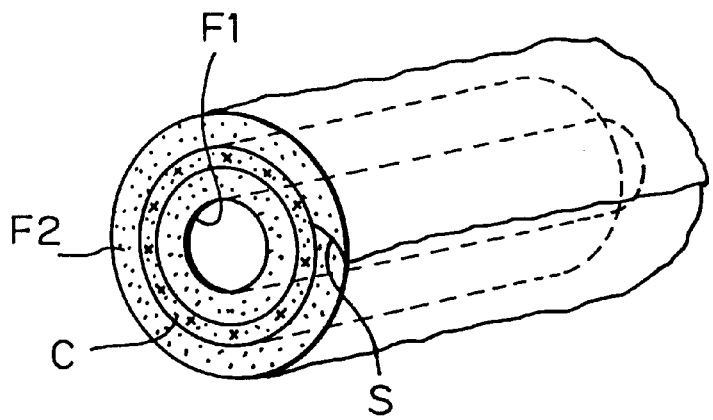

FIGS. 12(a)–12(c) show how the second fish paste sheet F2 having the inclined tailing edge surface S is wound. Since the second fish paste sheet is wound radially and is outermost relative to the other sheets, the difference in circular lengths between the inner and outer surfaces of the second fish paste sheet F2 is larger than those of the other inner sheets F1 and C. Thus, the leading edge surface of the second fish paste sheet will be inclined to a greater extent than those of the inner sheets. The inclined tailing edge surface S compensates for such inclination of the leading edge surface as shown in FIGS. 12(b) and 12(c).

Figure 13:
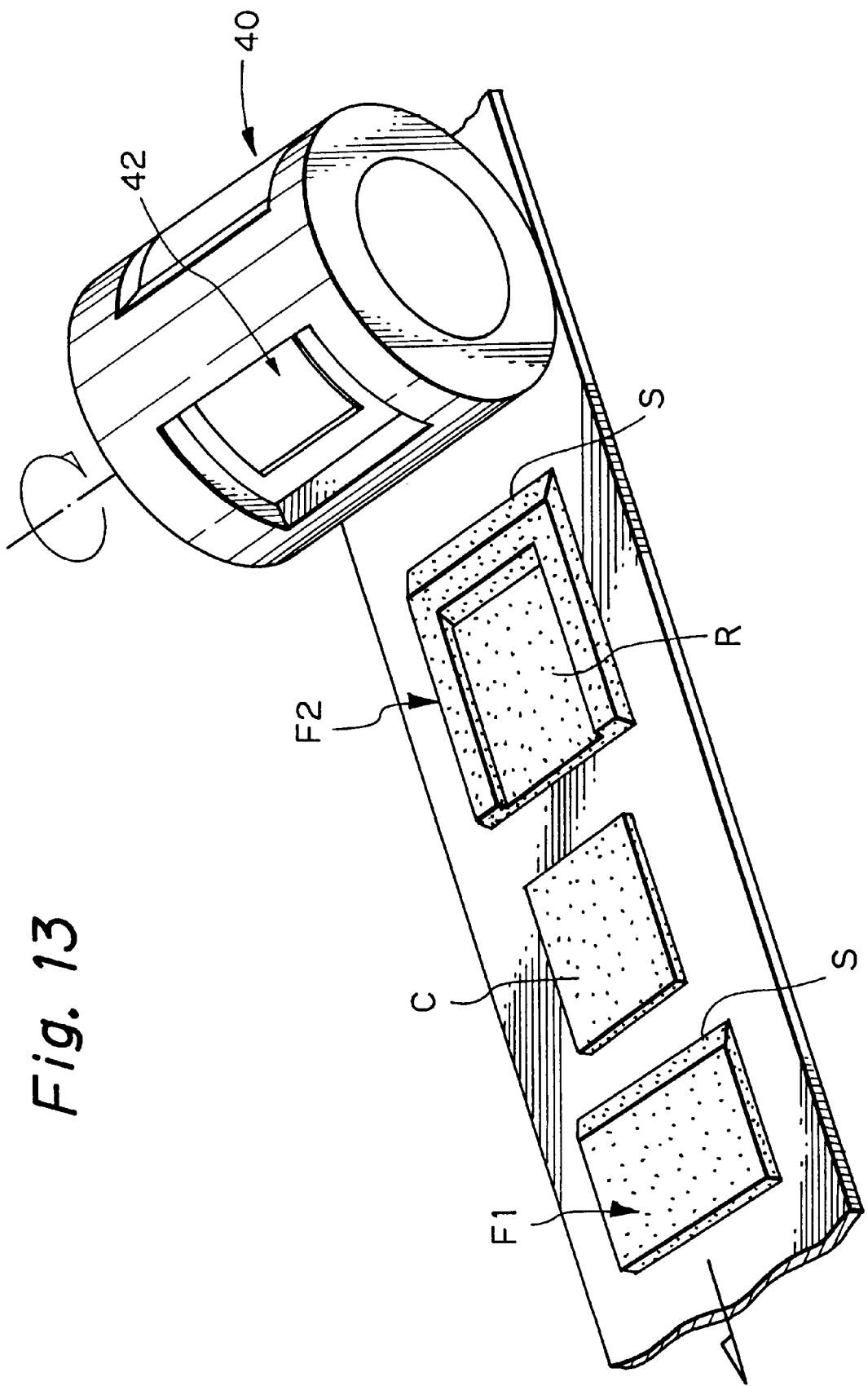
FIG. 13 is a perspective view of a paste shaping means in accordance with a fourth embodiment of this invention.

FIG. 13 shows the fourth embodiment of the fish paste shaping means having a drum similar to that of the third embodiment. The differences in features as compared with the third embodiment are that the first fish paste sheet F1 has an inclined tailing edge surface S like the second fish paste sheet F and that the first and second fish paste sheets are wider than the cheese sheet C. Further, the second fish paste sheet F includes a recess R which, when the sheets have been wound, receives the cheese sheet C therein. As in the embodiments explained above, the first and second fish paste sheets are attached to each other along the opposite side edges. Thus, the cheese sheet can not be seen from the outside. According to this embodiment, since the cheese sheet is received in the recess R of the second fish paste sheet, a cylindrical food formed by winding those sheets has the same diameter at any axial position.

FIGS. 14–18 show means for rectifying the shape of the food F, formed as stated above on the bar 16, so as to make the shape of the food closer to a true cylinder and to firmly attach the sheets to each other.

The means for rectifying includes a means for removing bars, around which a set of the sheets F1, C and F2 have been wound to form the food F, from the bar support means 28. Further, the means for rectifying also includes a rectifying drum means 61. The bar removing means includes a pair of bell cranks 62 pivotably connected to the side frames of the conveyor. The short arms 64 of the bell cranks are engaged with rotating cams 66 pivotally provided on the side frames of the conveyor 12. In turn, the bell cranks 62 are moved in the clockwise direction for one rotation of the cams 66 to remove the bar 16 along with the food F from the bar support plates 28. In the shown embodiment, the bar support plates 28 are provided with bar guide rails 68 integrally formed with the support plates 28 and extending rearwardly therefrom to the rectifying drum means 61. The rectifying drum means includes a rotational shaft 70 and a drum 72 fixedly provided on the rotational shaft 70 which is adapted to be rotated in the counterclockwise direction. In addition, a pair of sprockets 74 is fixedly provided on the rotational shaft axially outside of the opposite ends of the drum 72 and a pair of discs 76 is fixedly provided on the rotational shaft axially outside of the sprockets. Also, a pair of endless chains 78 is engaged with the sprockets 74 and with lower smaller sprockets 80, one of which is driven by a motor (not shown). Finally, endless belts 82 are engaged with a drive roller 84 and idle rollers 86.

Figure 16:
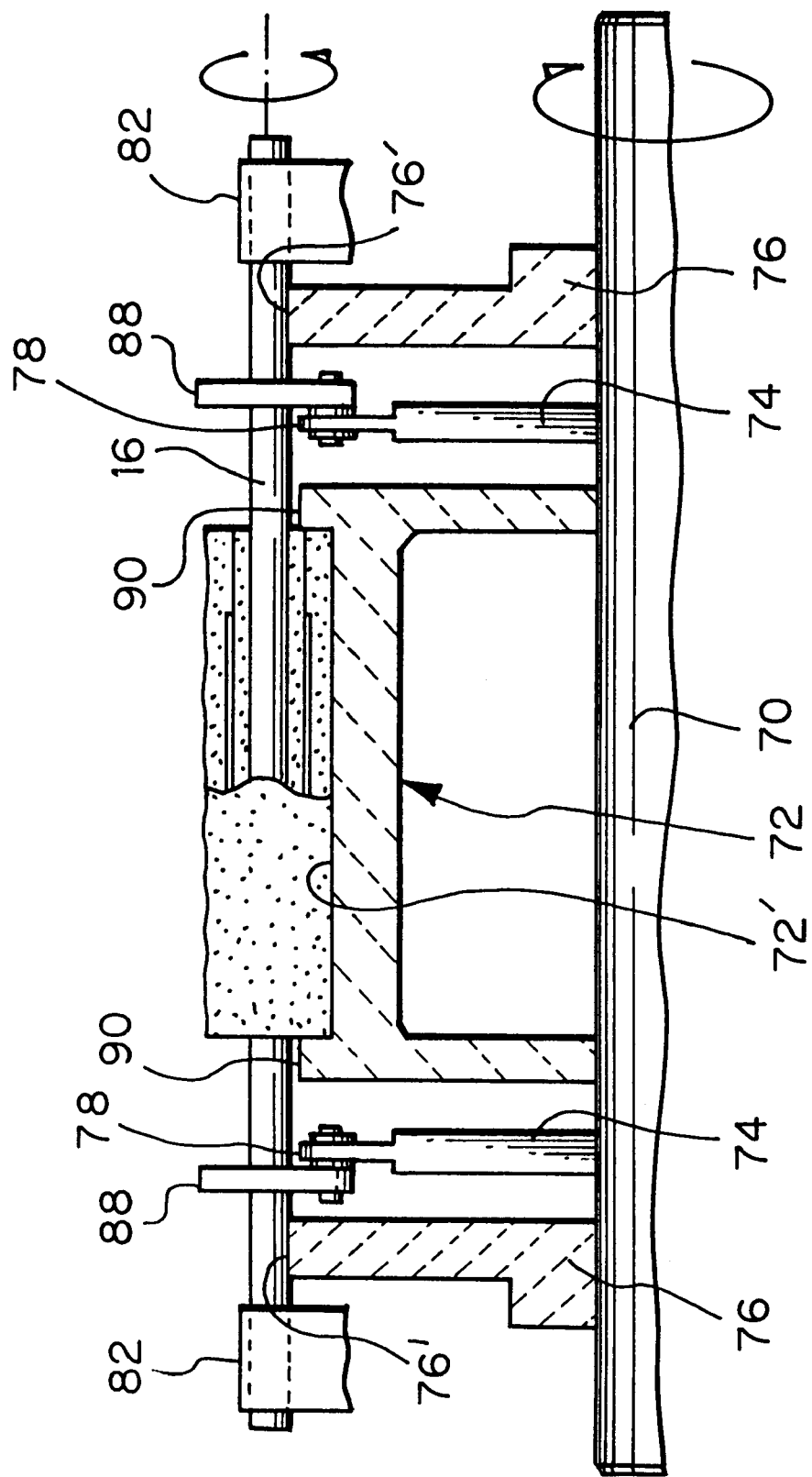
FIG. 16 is a cross-sectional view of an upper portion of a shape rectification drum of the shape rectification means shown in FIG. 14.
Figure 17:
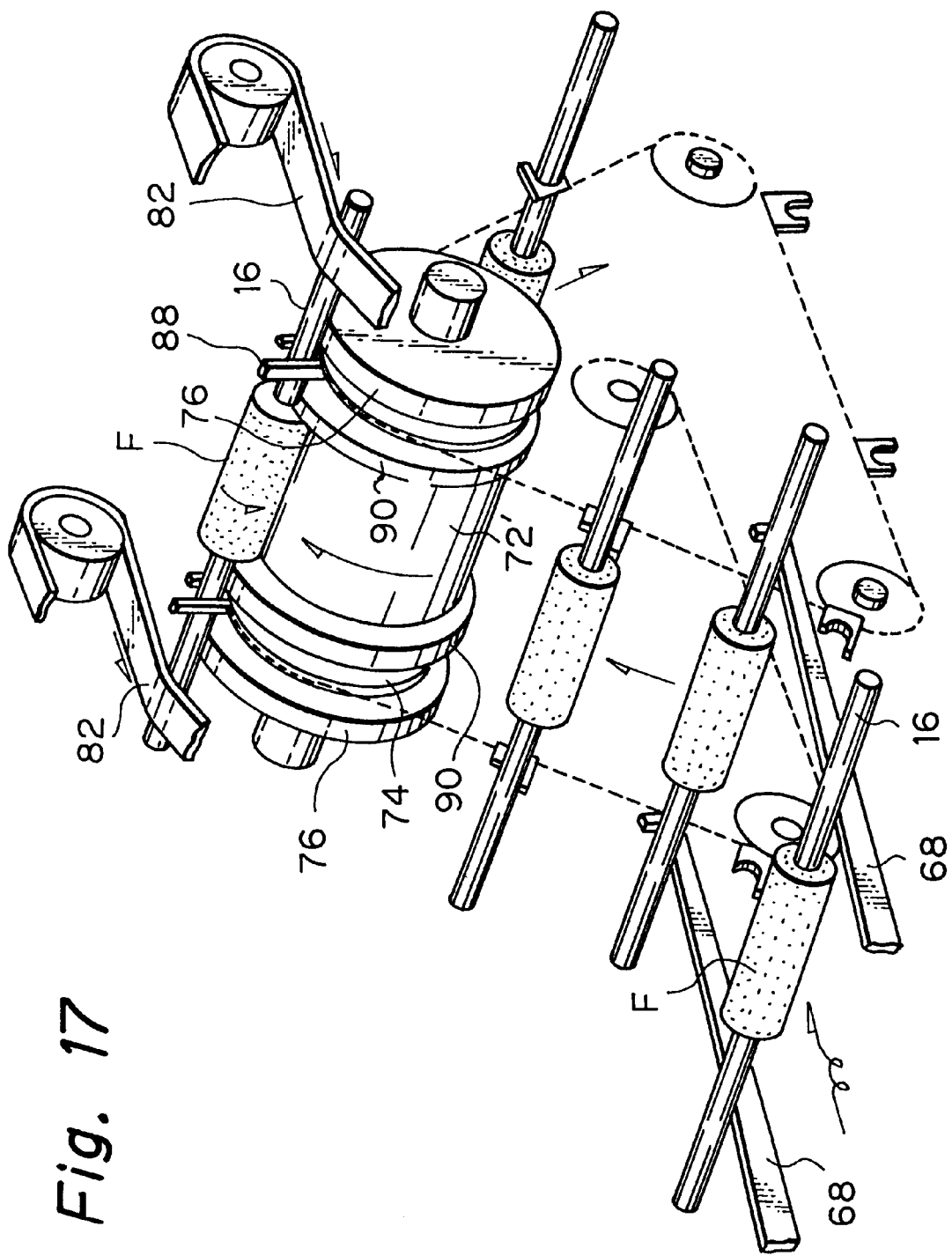
FIG. 17 is a perspective view of the shape rectification means of FIG. 14 as viewed from the upstream side in the flow of material to be processed.

The chains are provided with a plurality of hooks 88 at a predetermined interval which are adapted to receive the opposite ends of the bars 16 which have been discharged from the bar support plates 28 and are held at the left ends of the bar guide rails 68. When the bars supported by the hooks 88 come to upper portions of the sprockets 74, the opposite ends of the bars are engaged by the circular peripheral surfaces 76' of the discs 76. As shown in FIG. 16, the drum has a pair of flanges 90 at the opposite ends of the drum. The axially inner surfaces of the flanges 90 are substantially perpendicular to the axis of the drum and are adapted to cooperate with the peripheral surface 72' of the drum to receive a portion of the cylindrical food F. The diameter of the flanges 90 is smaller than that of the discs 76 and thus the bars do not come in contact with the flanges 90. When the bars come to the generally uppermost portions of the sprockets 74, they are engaged by the endless belt 82. The endless belt 82 is driven in the direction shown by an arrow X. Thus, the endless belt causes the bars to be rotated in the clockwise direction on the discs 76 so that the cylindrical food on the bars rotate on the peripheral surface 72' of the drum which is rotating in the counterclockwise direction. Therefore, the cylindrical food F is rotated within the confined space defined by the peripheral surface 72' of the drum and the vertical axially inner surfaces of the flanges 90 and is shaped into a true cylinder.

Figure 14:
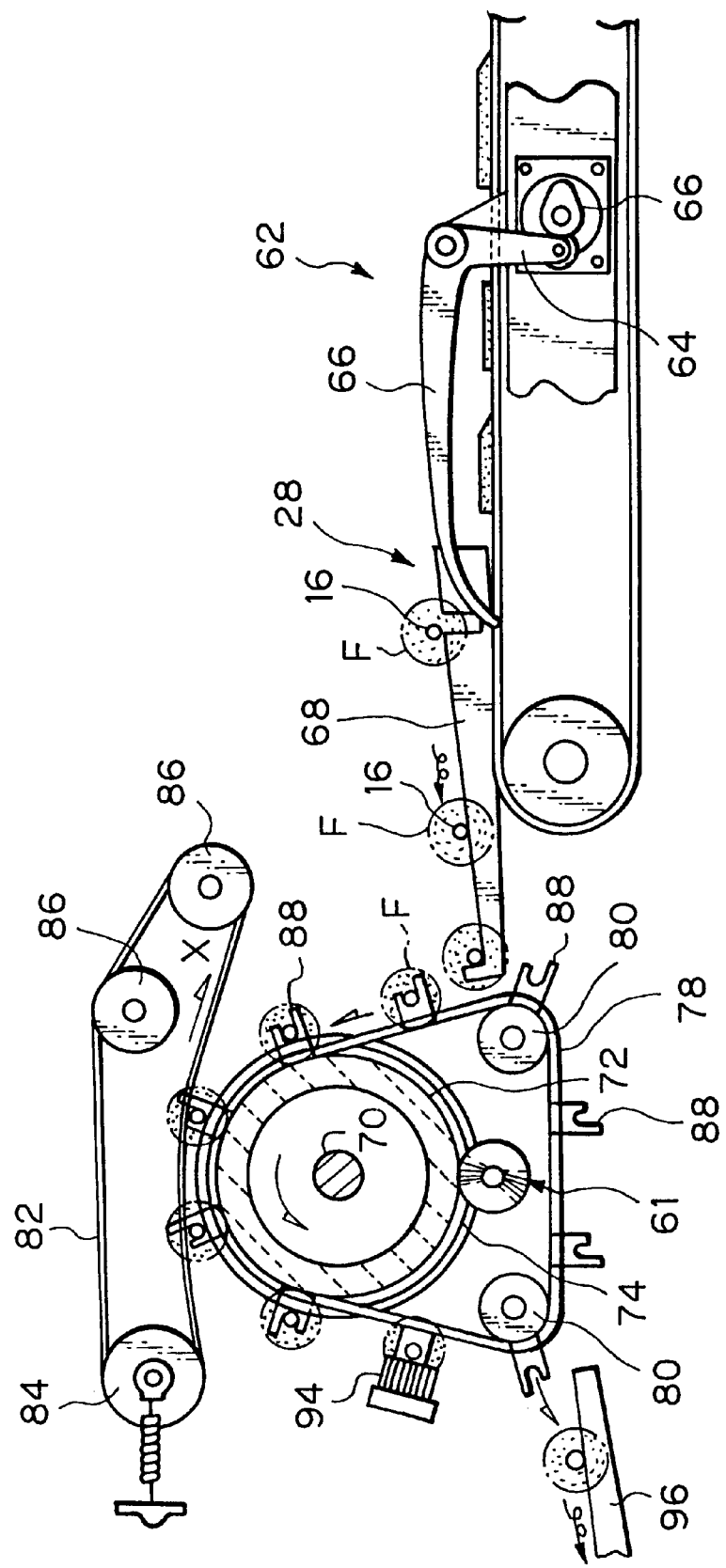
FIG. 14 is a side-elevation view of a shape rectification means used in connection with the apparatuses for producing a cylindrical food in accordance with this invention.
Figure 15:
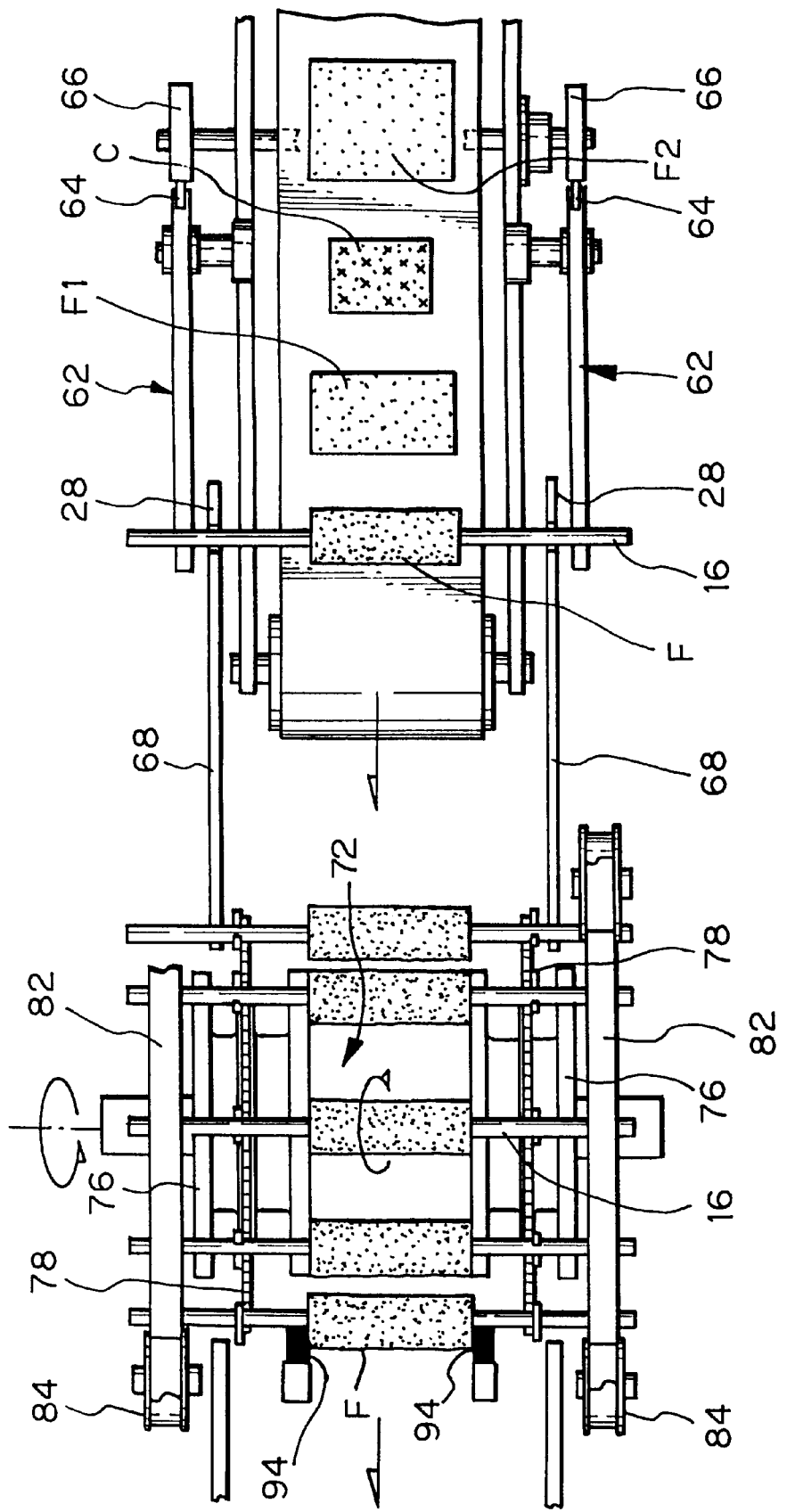
FIG. 15 is a plan view of the shape rectification means of FIG. 14.
Figure 18:
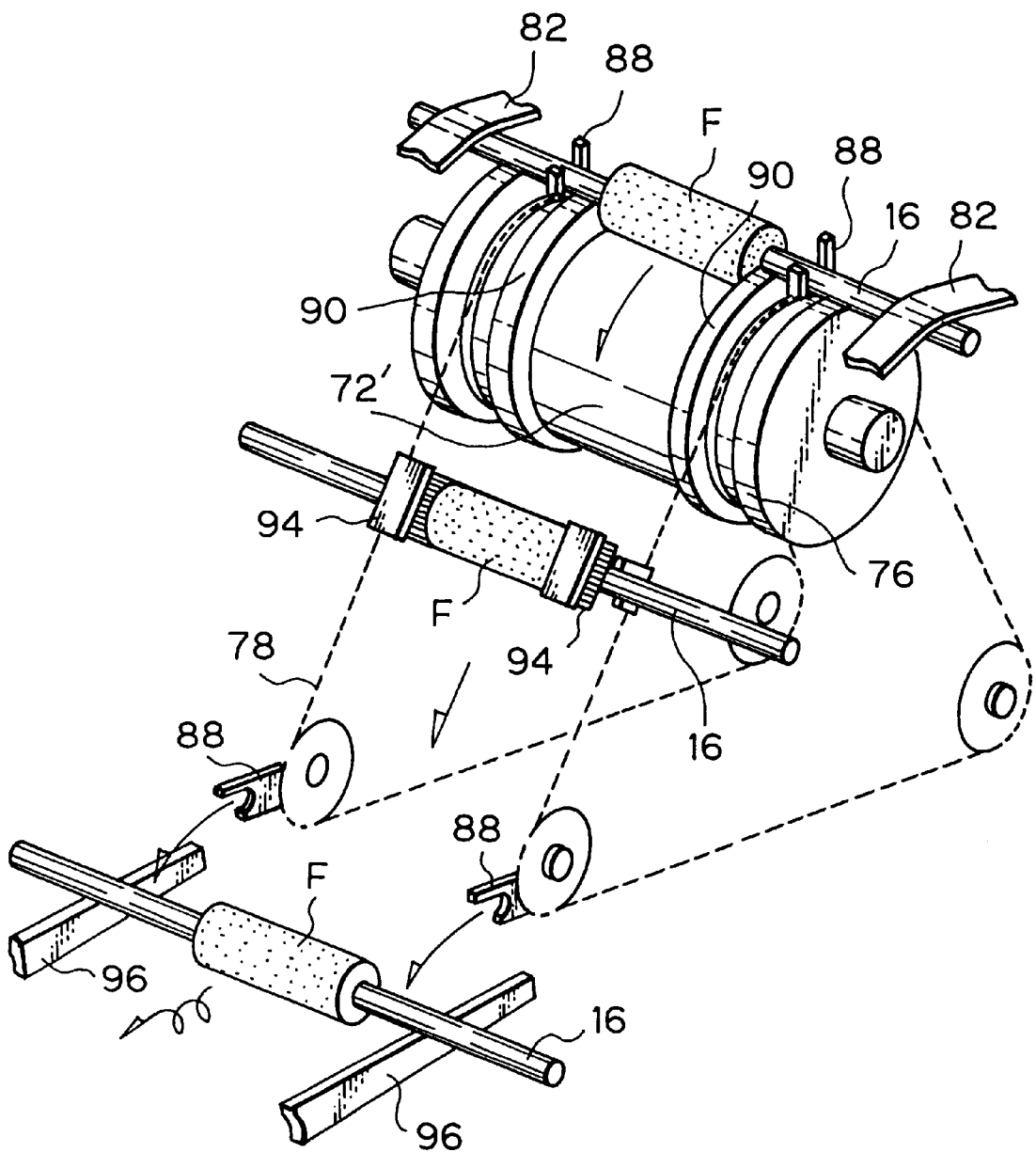
FIG. 18 is a perspective view of the shape rectification means as viewed from the downstream side.

In FIGS. 14, 15 and 18, reference numeral 94 designates brush means adapted to engage with the bars conveyed by the chain 78. The brush means is located just axially outside of the food F on the bars which have been subject to the shape rectifying operation to remove any adhering paste. Such removal is important because if such paste remains and is subject to broiling operation, it becomes difficult to remove the broiled cylindrical food smoothly from the bar. Reference numeral 96 designates bar guide rails for receiving the opposite ends of the bars, containing the shape-rectified food discharged from the rectifying drum means to guide them to a subsequent process such as broiling.

What is claimed is:

1. A method for producing a cylindrical food having multiple concentric layers, said method comprising:

shaping a food paste into a set of rectangular sheets having varying lengths such that an earlier produced rectangular sheet of the set has a smaller length than a later produced rectangular sheet of the set;

conveying the set of rectangular sheets along a conveying path such that the rectangular sheets are spaced a predetermined distance from each other and such that a leading edge and a trailing edge of each of the rectangular sheets are perpendicular to the conveying path;

winding the rectangular sheets, successively, around a bar positioned perpendicularly to the conveying path so that the bar is free to rotate and free to move vertically relative to the conveying path, such that each rectangular sheet begins wrapping, as a function of the predetermined distance between each rectangular sheet, only after the preceding rectangular sheet has been completely wound with the leading edge abutting the trailing edge.

2. The method of claim 1, further comprising:

forming an incline in the trailing edge of at least one rectangular sheet which extends rearwardly from a top surface of the rectangular sheet to a bottom surface of the rectangular sheet.

3. The method of claim 1, further comprising:

conveying the bar with the rectangular sheets wrapped therearound downstream such that the bar rotates about an axis;

shaping opposite ends of the rectangular sheets wrapped around the bar by passing the rectangular sheets between vertical end face shaping surfaces so that the opposite ends are substantially perpendicular to the bar.

4. The method of claim 3, further comprising:

rotating the bar with the rectangular sheets wrapped therearound at a predetermined distance between the bar and a surface on the conveying path which is equal to a desired radius of the cylindrical food, such that the rectangular sheets contact the surface between the vertical end face shaping surfaces under a pressure to form an outer periphery of the rectangular sheets into a substantially cylindrical shape.

5. The method of claim 1, further comprising:

supporting the bar on a supporting device which is positioned proximate the conveying path such that the bar remains free to rotate and free to move vertically relative to the conveying path; and removing the bar from the supporting device after all of the rectangular sheets of the set have been wrapped around the bar.

* * * * *